United States Patent Office

3,763,065
Patented Oct. 2, 1973

3,763,065
THIXOTROPIC COMBINATION
Ernst Herrmann, Emmerich-Borghees, Germany, assignor to Hager & Kassner KG, Hamm, Germany
No Drawing. Filed Sept. 16, 1970, Ser. No. 72,820
Int. Cl. C08g 41/04
U.S. Cl. 260—22 TN    9 Claims

ABSTRACT OF THE DISCLOSURE

High degree of thixotrophy is provided in a hardening resin made by mixing a first liquid (I) consisting essentially of (a) polyhydroxy compounds that react with a polyisocyanate to yield a solid polyurethane, and (b) a catalyst for vinyl-type polymerization, and a second liquid (II) consisting essentially of (a) a polyester-cement mixture of a polymerizable vinyl-type monomer such as styrene with a linear carboxyl-terminated unsaturated polyester having a molecular weight of at least 1,000, (b) polyisocyanates that react with the polyhydroxy compounds to yield the polyurethane, (c) a partly polymerized acrylic and/or a methacrylic ester of a low alkanol (up to hexanol), the proportions of the ingredients being such that upon mixing the two liquids the catalyst causes all the unsaturated II ingredients to polymerize and the polyisocyanates react to form a polyurethane with all of the polyhydroxy compounds, and the amount of polyurethane is from 0.5 to 3 times the weight of the compounds of the vinyl-type polymerizing system. Liquid (I) and liquid (II) are separately stable and can be stored for many months with or without a polymerization inhibitor present in liquid (II).

---

The present invention relates to a resin-formed liquid mixture that solidifies, and before it becomes solid shows a high degree of thixotropy. Generally a product according to the invention combines at least two different resin-forming systems, each yielding a solid resin by forming macro-molecules.

It has been found that a mixture of a system forming macro-molecules by condensation (polyaddition) and a system forming macro-molecules by polymerization produces a very strong thixotropic effect.

The foregoing as well as other objects of the present invention will be more fully understood from the following description of several of its exemplifications.

Very effective mixtures of the present invention combine a polyurethane-forming system and a polyester-cement-forming system. Such a mixture contains:

(a) polyhydroxy compounds;
(b) polyisocyanates;
(c) a polymerizable, that is unsaturated, polyester;
(d) a vinyl-type monomer;
(e) 2 to 25% of a pre-polymerized vinyl compound such as a polyacrylic or polymethacrylic ester of a low alkanol, which pre-polymerized material should have a molecular weight of about 50,000 to 1000,000; and
(f) a polymerization catalyst.

The pre-polymerized vinyl material is soluble in the vinyl monomer and increases the thixotropic effect when used in concentrations of from 4 to about 40%, preferably 10 to 30%, of the polyester-cement ingredients. The mixture can also contain polymerization accelerators such as N,N'-dimethyl paratoluidine.

Organic and inorganic solid fillers and pigments can also be added, as well as up to 10% plasticizer, based on the total weight of the resin-forming ingredients.

In the following examples all parts and percentages are given by weight unless otherwise specified.

EXAMPLE A

Liquid I

Polyester of glycerol and polymerized oleic acid in which the oleic acid is 75% dimerized, 22% trimerized and 3% monomeric, the hydroxy value of said ester being 248 and its viscosity 120,000 centipoises at 25° C. This polyester is prepared by boiling a mixture of 161 g. glycerol and 600 g. polymerized oleic acid with 0.5% lead oxide between 230°: 77.6 parts
Triethyleneglycol: 19.4 parts
Benzoyl peroxide (as a 50% paste in a little dimethyl phthalate): 3.0 parts

Liquid II

A mixture of 35% styrene and 65% linear polyester of maleic acid and ethylene glycol, the polyester having a molecular weight about 1200 and an acid value of 24: 9.8 parts
Toluylenediisocyanate (80%, 2,4- and 20% 2,6-): 1.7 parts
Polymethylmethacrylate having a molecular weight about 80,000: 3.4 parts
Polybutylmethacrylate having a molecular weight about 60,000: 7.4 parts
N,N-dimethylparatoluidine: 0.15 part
Methylmethacrylate monomer: 6.4 parts
Addition polymer of (a) 13% polypropyleneglycol having a molecular weight of about 1,000 with (b) 87% polyphenylpolymethylenepolyisocyanate having 32% NCO-groups. Compound (b) is prepared by phosgenating the adduct formed by bubbling formaldehyde into aniline which is cooled to 0° C. and a mixture of the adduct and toluene is saturated with phosgene. Then the mixture is heated to 60–70° C. and phosgene is added again until the mixture becomes clear. Solvent, hydrogen-chloride and isocyanate are separated by distillation: 49.15 parts
Styrene monomer: 22.0 parts When the above Liquids I and II are mixed, they form a pasty liquid with a viscosity of about 42,000 centipoises at 20° C. Thixotropy is generated 5–8 minutes after mixing and such a thixotropic liquid can be applied as a water-resistant, non-porous coating as much as 3 millimeters thick to reinforced concrete or asbestos cement tubes by painting even on vertical or hanging (ceiling) surfaces. The layers so applied stay in place and harden (solidify) in about 12 hours, reaching maximum hardness after about four days.

EXAMPLE B

Liquid I

Blown castor oil, viscosity 60 poises at 25° C.: 18.0 parts
Tetraethylene glycol: 2.2 parts
Nonaethylene glycol: 2.2 parts
Condensation product of trimethylolpropane with propylene oxide and having a molecular weight of about 420: 4.4 parts
Castor oil: 6.0 parts
Blanc fixe: 34.0 parts
Talc of about 20 micron particle size: 4.0 parts
Asbestos meal (hornblende) finely ground: 10.0 parts
Heavy spar: 8.0 parts
Titanium dioxide powder: 10.0 parts
50% benzoyl peroxide dispersion in dimethyl phthalate: 1.2 parts

Liquid II

Carboxy-terminated polyester of ethylene glycol and maleic acid and having a molecular weight of about 1,000: 2.6 parts
Toluylene-2,6-diisocyanate: 0.95 part
Styrene: 12.7 parts Methylmethacrylate monomer: 3.2 parts
Butyl-methacrylate polymer having a molecular weight of about 60,000: 1.5 parts
Methylmethacrylate polymer having a molecular weight of about 80,000: 1.5 parts
The polyphenylpolymethylenepolyisocyanate having 32% NCO-groups of Example A (compound b): 23.0 parts
N,N-dimethyl-para-toluidine: 0.05 part Liquids I and II of both of the above examples are relatively stable when kept separate, and can be separately stored for a great many months. The viscosity of Liquid I of Example B at 20° C. is about 17,000 centipoises as measured with the "Viscotester" of Messrs. Haake, Berlin, and the viscosity of Liquid II of Example B is similarly determined to be 110 centipoises at 20° C. After mixing the two components the mixture of Example B should be stirred well for 30 seconds, at which time the viscosity reaches 1,700 centipoises. After 3–5 minutes this mixture has such a high degree of thixotropy that a quantity of 2–8 lbs. by weight is not able to flow unless stirred or displaced by mechanical forces. This thixotropic condition is maintained until the material hardens into a solid resin after about 20 minutes. During this interval the material can be cast around solid members to form an adherent assembly after hardening, or it can be applied as a heavy coating layer that will not run significantly on vertical surfaces.

EXAMPLE C

Liquid I

The reaction product produced by heating for 8 hours at 130–140° C. 6 mols adipic acid with 3.5 mols butylene glycol and 3.5 mols trimethylolpropane, then the temperature is increased slowly over 4 hours to 200° C. and the reaction water is separated by distillation, the product having a hydroxyl value of 214 and an acid value of 3: 20.0 parts
The reaction product of 1 mol propylene glycol with 16 mols propyleneoxide: 15.0 parts
Tetraethylene glycol: 0.8 part
Hexaethylene glycol: 4.2 parts
Microhornblende asbestos meal: 10.0 parts
Blanc fixe (low oil value): 39.8 parts
Talc of about 1 to 20 micron particle size: 3.8 parts
Sodium-alumino-silicate powder (zeolite): 5.0 parts
50% benzoyl peroxide dispersion in dimethyl phthalate: 2.2 parts

Liquid II

Unsaturated carboxy-terminated polyester of 5 mols ethylene glycol with 3 mols maleic and 2.5 mols phthalic acids, having a molecular weight of about 1,200: 2.8 parts
Polybutylmethacrylate having a molecular weight of about 60,000: 3.4 parts
Polymethylmethacrylate having a molecular weight of about 80,000: 1.7 parts
Methylmethacrylate monomer: 3.7 parts
Styrene: 15.9 parts
N,N-dimethyl-para-toluidine: 0.06 parts
The reaction product of 67 parts of the polyphenylpolymethylenepolyisocyanate of Example A with 33 parts polypropylene glycol of a molecular weight 2000, the reaction product containing 20% free isocyanate
N,N-dimethyl-para-toluidine: 0.06 part The mixture of this example is prepared and used in the same way as those of Examples A and B, and produces a thixotropic material of similar characteristics.

All of the ingredients should have a water content less than 0.01%. Any fillers and pigments that are to be included in a vinyl monomer composition intended for storage should be free from materials such as compounds of iron, which catalyze the polymerization of such monomers.

The viscosity of Liquid I of Example C at 20° C. is about 36,000 centipoises, that of Liquid II about 280 centipoises. After mixing of the two liquids and after stirring well for 30 seconds the viscosity of the mixture is about 3,100 centipoises. After about 5 minutes this mixture is strongly thixotropic and a quantity of 4–10 lbs. will not flow out from its mixing container without stirring or agitation by other mechanical forces. This mixture can be used to bond together wet surfaces, for instance in the case of under-water connections of concrete, and a good tensile strength is obtained.

The mixture of Example C can serve especially immediately after mixing, when thixotropy is not fully generated, as a filler for the grooves between floor boards. Due to its thixotropy, which is slowly increased in situ, the resin will not flow into all the lower cavities of the grooves in the boards, and less resin is therefore used. On the other hand, the upper surface of the resin can easily be smoothed out with a spatula, after the mass has reached its full thixotropy.

The mixture of Example C is very well suited to connect storage battery covers with their battery containers, both made from polystyrene or from hard rubber. Grooves provided in the margins of the lower face of the cover are filled with the liquid resin while the cover is upside down. After thixotropy is generated the cover is turned rightside up without any flow of the resin, and is pressed down over the upper rim of the container. Due to the pressing the resin is reliquefied and can flow into all the cavities of the two pieces. After hardening, a connection of considerable mechanical strength is obtained.

From about 10 to 50% of polyhydroxy compounds and polyisocyanates used in the present invention are bifunctional, the balance being essentially trifunctional. Up to about 10% monofunctional hydroxy compounds and isocyanates can be present, based on the total quantities of hydroxy compounds and isocyanates.

It is preferred that the polyester-cement-forming ingredients have about 2 to 8 times as much vinyl-type monomer (e.g. styrene) as polyester. It is also helpful to store the vinyl-type polymerizable system with an inhibitor such as a hydroquinone like dimethyl ether of hydroquinone, that keeps it from polymerizing until mixed with the catalyst, and is also compatible with the polyisocyanate.

The following are other compounds that can be used in accordance with the present invention:

(a) Polyhydroxy compounds: glycerol, hexane glycerol, trimethylolpropane, pentaerythritol, hexols such as sorbitol, ethylene glycol, diethylene glycol, butylene glycol, hexylene glycol, octylene glycol, alcohol esters of hydroxy acids, etc., amine alcohols such as triethanolamine, polyesters prepared from polyols of above type and polycarboxylic compounds such as phthalic acid or polymerized unsaturated fatty acids, polyhydroxylic compounds made by treatment of natural fats and oils with polyalcohols such as glycerol or pentaerythritol, and ethers and polyethers prepared from the above polyhydroxy compounds by condensation with alkylene oxides such as ethylene oxide and/or propylene oxide and/or butylene oxide, or with mercapto diethylene glycol

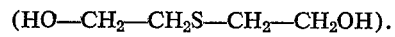
$$(HO-CH_2-CH_2S-CH_2-CH_2OH).$$

(b) The polyisocyanates can be any of the aliphatic, hydroaromatic or aromatic ones used to make polyurethanes, such as: hexamethylene diisocyanate, trimethyl-hexamethylene-diisocyanate, the biuret polyisocyanate prepared by reacting hexamethylene-diisocyanates and water, toluene diisocyanates, the phosgenation products of anilineformaldehyde condensates, and urethane prepolymers containing free isocyanate groups.

(c) Unsaturated polyester: polyesters of dicarboxylic or tricarboxylic acids such as maleic acid or fumaric acid with dihydroxy or trihydroxy alcohols such as glycol or glycerol.

(d) Vinyl-type monomer: styrene, vinyltoluenes, polymerizable esters of acrylic and/or methacrylic acid with a lower alkanol (up to hexanol).

(e) Polymerization catalyst: the peroxide of benzoic acid, cumene peroxide, iron compounds, with or without accelerators such as aromatic polyamines.

(f) Fillers and pigments which can be applied are all those which are otherwise usual for plastics or paints, e.g. bentonite, blanc fixe, heavy spar, pulverized asbestos, titanium dioxide, iron oxides, but it is to be noted that some of the metallic compounds have catalyzing effects. Finely divided fully polymerized epoxy resins also make good fillers.

As plasticizers the well known phthalic acid esters such as dibutyl phthalate, chlorinated diphenyls and triphenyls, tar and tar oil, fatty oils, and also thickening resins, can be included in the compositions. Hydroxyl-free epoxy compounds such as higher fatty acid esters of linear condensations of epichlohydrin and bisphenol A can also be used as plasticizers, as by incorporation in Liquid I or II.

The components of the resins interact when all are mixed together. They are however conveniently prepared as two separate liquids to be mixed together when needed. Such separate liquids are illustrated in the examples and include a Liquid I that contains (a) the polyhydroxy compounds, that react with polyisocyanates to yield a solid polyurethane, and (b) the catalysts for vinyl-type polymerization, Liquid II containing the carboxyl-terminated unsaturated polyesters and polymerizable monomers such as styrene, (b) polyisocyanates that react with the polyhydroxy compound to yield the solid polyurethane, (c) polymeric vinyl compounds, and (d) polymerization accelerators if used. The proportions of the ingredients are such that upon mixing the two liquids the catalysts, with or without the accelerators, cause all the unsaturated II ingredients to polymerize, the polyisocyanates form a polyurethane with all of the I(a) polyhydroxy compound, and the amount of polyurethane is from about 0.5 to about 3 times the weight of the vinyl-type polymerizing system, both monomer and polymer.

Obviously many modifications and variations of the present invention are possible in the light of the above teachings. It is, therefore, to be understood that within the scope of the appended claims the invention may be practiced otherwise than as specifically described.

What is claimed is:

1. A thixotropic mixture of
   (I) a first liquid consisting essentially of (a) polyhydroxy compounds that react with a polyisocyanate to yield a solid polyurethane, and (b) a catalyst for vinyl polymerization, and
   (II) a second liquid consisting essentially of (a) a polyester-cement mixture of a vinyl monomer with a carboxyl-terminated polyester of a low alkylene glycol and an unsaturated lower alkylene dicarboxylic acid, the polyester having a molecular weight of at least 1000, (b) polyisocyanates that react with the polyhydroxy compounds to yield a solid polyurethane and (c) 4 to 40% of a polymer of acrylic or methacrylic ester of a lower alkanol, such polymer having a molecular weight between about 50,000 and 100,000, the proportions of the ingredients being such that the catalyst causes all the unsaturated (II) ingredients to polymerize, the polyisocyanates form a polyurethane with all of the (I)(a) polyhydroxy compounds, and the amount of polyurethane is from about 0.5 to about 3 times the weight of the vinyl polymerizing system that includes the polyester cement.

2. The combination of claim 1 in which the mixture also contains finely divided solid inorganic filler.

3. The combination of claim 1 in which the polyhydroxy compounds include castor oil.

4. A method for forming a shaped solid resin mass which method comprises preparing the thixotropic mixture of claim 1, shaping the mixture while it is thixotropic, then positioning the mixture so that it would flow to a different shape were it not for its thixotropic nature and causing he thus positioned mixture to harden without significantly changing its shape.

5. A liquid which is essentially a mixture of (a) polyhydroxy compounds that react with a polyisocyanate to yield a solid polyurethane, and (b) a catalyst for vinyl polymerization, the polyhydroxy compounds being inert to the catalyst, and the proportion of catalyst being such that it will effectively catalyze vinyl polymerization in a quantity about ⅓ to about 2 times the weight of polyurethane yielded by the polyhydroxy compounds.

6. A liquid according to claim 5 in which one of the polyhydroxy compounds is castor oil.

7. The combination of claim 6 in which the castor oil is blown castor oil.

8. A liquid consisting essentially of (a) a polyester cement mixture of a vinyl monomer with a carboxyl-terminated polyester of a low alkylene glycol and an unsaturated lower alkylene dicarboxylic acid, (b) polyisocyanates that react with polyhydroxy compounds to yield a solid polyurethane, and (c) a polymer of the acrylic or methacrylic ester of a lower alkanol, such polymer having a molecular weight between about 50,000 and 100,000, the polymerized vinyl compound being about 4 to 40% of the liquid and the polyisocyanates being in a proportion that yields a polyurethane weighing from about 0.5 to about 3 times the combined weight of ingredients (a) and (c).

9. The combination of claim 8 in which the liquid also contains a polymerization accelerator.

References Cited

UNITED STATES PATENTS

| | | | |
|---|---|---|---|
| 3,644,569 | 2/1972 | Pietsch et al. | 260—859 R |
| 3,484,401 | 12/1969 | Rudolph et al. | 260—22 CB |
| 3,629,169 | 12/1971 | Bedighian | 260—22 CB |
| 3,647,766 | 3/1972 | Bertozzi | 260—77.5 AP |
| 2,955,058 | 10/1960 | Foster | 117—161 |
| 3,547,848 | 12/1970 | Marsh et al. | 260—22 |
| 3,183,109 | 5/1965 | Neumann et al. | 106—252 |
| 3,532,652 | 10/1970 | Zang et al. | 260—859 |
| 3,546,148 | 12/1970 | Diamond et al. | 260—18 |
| 3,576,777 | 4/1971 | Neumann et al. | 260—22 |

FOREIGN PATENTS

| | | | |
|---|---|---|---|
| 994,297 | 6/1965 | Great Britain | 260—859 |
| 1,151,116 | 7/1963 | Germany | 260—75 |

DONALD E. CZAJA, Primary Examiner

R. W. GRIFFIN, Assistant Examiner

U.S. Cl. X.R.

106—252; 117—161 KP, Dig. 5; 260—40 TN, 75 NP, 77.5 AP, 859 R, 861, 873